Sept. 12, 1950 — R. J. FRETER — 2,522,440

COLD PUNCHING METAL PARTS

Filed Sept. 22, 1949

INVENTOR.
BY Roy J. Freter

Patented Sept. 12, 1950

2,522,440

UNITED STATES PATENT OFFICE 2,522,440

COLD PUNCHING METAL PARTS

Roy J. Freter, Columbus, Ohio

Application September 22, 1949, Serial No. 117,163

4 Claims. (Cl. 164—124)

My invention produces in one operation a degree of hole accuracy, surface toughness, and finish heretofore obtained only by two or more separate operations.

Where accurately shaped, highly finished holes in metal are required, it has heretofore commonly been the practice of industry to subject its work pieces to three separate and distinct operations. (1) A punching or drilling operation, producing a rough preliminary hole. (2) A second separate operation of reaming, which increases the accuracy of the hole and eliminates the taper left by the shear of the punch. (3) A third separate operation of re-reaming or grinding, which further increases the accuracy and smoothness.

In instances not common, the piercing operation (1) above is followed by a step-like cutting shoulder on the same apparatus, producing a reshear closely behind piercing portion. There is no broaching or planishing of the work piece when this practice is followed.

In other instances not common, the piercing operation is followed by a separate operation. Such second and separate operation is used to broach and burnish the hole previously pierced. This means subjecting the work piece to two separate and distinct operations.

In other instances not common, the piercing operation is followed by an enlargement of the apparatus diameter closely behind the piercing portion. The junction of the diameter enlargement is in the nature of a curve or taper working usually in combination with a specially designed die. The purpose of this punch and die combination is to create a cold flowing of the metal in the work piece hole wall. This apparatus is unacceptable for many uses as it results in the accumulation of excess flowed metal at the exit of the punched hole, which must be removed by a separate deburring operation. My invention does not employ the use of any special die, and as it leaves no excess at the hole exit, no deburring of the work piece is required. In addition, my invention produces a higher degree of accuracy due to the integral broaching process.

In view of the increasing demand for precision holes by the metal working industry, the elimination of one or more of the operations just described will result in a great savings in time, machinery, and of course costs. My invention will produce a degree of hole accuracy, finish, and surface toughness never heretofore obtained with a single stroke of a machine, using a single combination tool.

In the drawing

Figure 1:
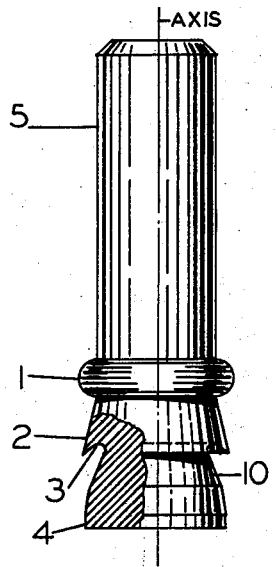
Figure 1 is a plan view of an apparatus formed in accordance with one specific embodiment of my invention.

Figure 1 illustrates planishing bead 1, broaching tooth 2, and piercing portion 4, all integral with punch body 5. The undercut 3 is commonly used on broaching teeth.

Figure 2:
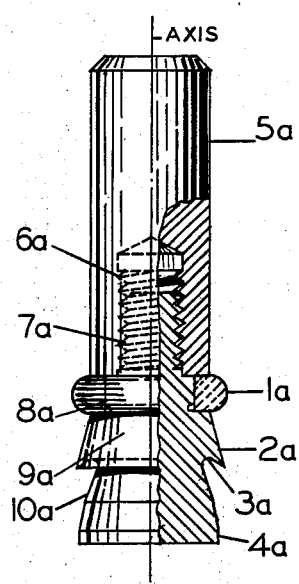
Figure 2 is a plan view of an apparatus formed in accordance with a second specific embodiment of the same present invention.

Figure 2 illustrates a component type embodiment of my invention. The descriptive numerals correspond so far as they are common to both Figure 1 and Figure 2. For example, punch body 5 in Figure 1 corresponds to punch body 5a in Figure 2.

Figure 2 illustrates the apparatus composed of three separate parts; the punch body 5a, with internal thread 6a receives the external thread 7a on lower punch body 9a.

Figure 2 illustrates planishing bead 1a, the third separate part. In this component type embodiment of my invention, the planishing bead 1a is made of carbide or other similar hard material. Planishing bead 1a is slipped over shoulder 8a on lower punch body 9a, before the two parts of the punch body 5a and 9a are screwed together. Shoulder 8a on lower punch body 9a centers the planishing bead 1a about the axis of punch, co-axially with the piercing portion 4a and the broaching tooth 2a.

The component type embodiment illustrated in Figure 2 produces an advantage of extra tool economy on production runs of relatively large scope because; first, it permits the use of a long wearing material such as carbide for the planishing bead, and second because it permits the replacement of components worn or damaged incident to such long run operations.

An explanation of the specific function of my invention will apply to both embodiments herein designated Figure 1 and Figure 2.

To perform its function this apparatus is inserted in a suitable tool holder not herein illustrated. The tool holder may be a part of any machine arranged for cold punching metal parts.

The forcing of the piercing portion 4 or 4a through a metal work piece produces a rough and tapered preliminary hole in the work piece. At this point a burr is necessarily produced at the exit of the work piece.

The taper in the pierced hole and the burr at the exit of the hole are removed by the broaching tooth 2 or 2a, which cuts material away from the sides of the hole. The broaching tooth 2 or 2a employs an undercut 3 or 3a for cutting and curling the chips of the material.

The planishing bead 1 or 1a smoothes out the tool marks left by the piercing and broaching. The planishing bead 1 or 1a also compacts the metal in the sides of the hole as it passes through, producing a highly finished accurate hole.

It should be noted that the broaching tooth 2 or 2a is necessarily of a greater diameter than the punching portion 4 or 4a so that the broaching tooth 2 or 2a can engage the metal in the work piece. For the same reason it is necessary that the planishing bead 1 or 1a be of a greater diameter than the broaching tooth 2 or 2a.

Figure 3:
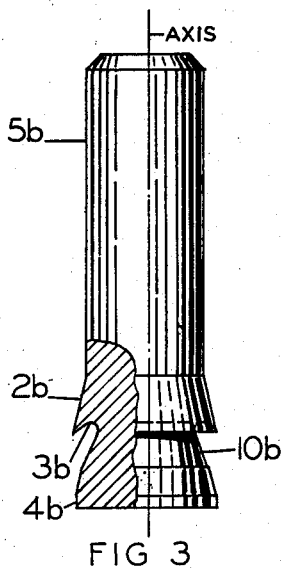
Figure 3 is a plan view of an apparatus formed in accordance with a third specific embodiment of the same present invention.

The separate embodiment of my invention shown in Figure 3 differs from the embodiment shown in Figure 1 only to the extent that the integral planishing bead 1 of Figure 1 is not present in Figure 3. The embodiment shown in Figure 3 may be used where the surface densification and added hole accurcy produced by the planishing bead is not required. The undercut 3b in the broaching tooth 2b is employed to curl the chips of metal as they are cut from the hole wall. This undercut tooth, curling metal chips behind the piercing portion of the punch, eliminates the relative inaccurate practice of crowding metal ahead of a flat-faced reshearing shoulder. The necked-in shank section 10b, following the piercing portion, provides room for the metal chips curled from the hole wall by the undercut broaching tooth.

Figure 4:
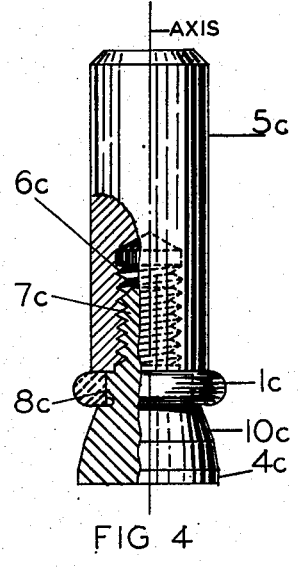
Figure 4 is a plan view of an apparatus formed in accordance with a fourth specific embodiment of the same present invention.

The separate embodiment of my invention shown in Figure 4 differs from the embodiment shown in Figure 2 only to the extent that the integral broaching tooth 2a of Figure 2 is not present in Figure 4. The embodiment shown in Figure 4 may be used where surface densification is desired, but the added accuracy produced by the broaching and planishing combination is not required. The removable planishing bead 1c is made of a long wearing material such as carbide. Because of the two piece punch body construction, this planishing bead may be removed and replaced in the event of breakage or wear. Hole wall densification and increased accuracy of hole size is obtained when this embodiment is used in conjunction with a standard female punch die. The convex working surface of the planishing bead 1c need not be semicircular in section, but may assume any convex shape that will smooth and densify the hole wall.

The four embodiments of my invention herein described and illustrated are in no way limited to the production of round holes. Holes of any cross sectional shape may be formed, and the common round hole is merely one illustrative example.

My invention may be contained in different forms of construction for different purposes, all of which come within the purview of my claims hereinafter appended. Therefore I have described and illustrated for purposes of disclosure, four specific embodiments of my invention. It is obvious that those skilled in the art may vary the details without departing from the spirit of the invention, and therefore it is not wished to be limited by what is herein described and illustrated, except as may be required by the claims.

I am aware that the combination of a punch with a supplemental cutting shoulder is not new. I am also aware that the combination of a punch with a coaxial taper section working in conjunction with a special female die is not new. I therefore do not claim any of such combinations.

I claim:

1. An apparatus for cold punching metal parts producing, in one operation, accurately sized highly finished holes with densified parallel sides: a punch having a piercing portion on its end, followed by a necked-in shank section for chip clearance; followed by a coaxial broaching tooth at a slightly greater distance from the axis of punch than the piercing edge, said broaching tooth being undercut to curl the chips of metal as they are cut from the walls of a hole of any cross sectional shape; followed by a coaxial planishing bead with a convex working surface, at a slightly greater distance from the axis of punch than the broaching tooth.

2. An apparatus for cold punching metal parts producing, in one operation, accurately sized highly finished holes with densified parallel sides: a punch of three component parts having a piercing portion on its end, followed by a necked-in shank section for chip clearance; followed by a coaxial broaching tooth at a slightly greater distance from the axis of punch than the piercing edge, said broaching tooth being undercut to curl the chips of metal as they are cut from the walls of a hole of any cross sectional shape; followed by a coaxial planishing bead with a convex working surface, at a slightly greater distance from the axis of punch than the broaching tooth; and with the body of such punch being of two separate parts to allow the mounting of a separate and removable planishing bead at the junction of the two punch body parts.

3. An apparatus for cold punching metal parts producing, in one operation, accurately sized highly finished holes with parallel sides: a punch having a piercing portion on its end followed by a necked-in shank section for chip clearance; followed by a coaxial broaching tooth at a slightly greater distance from the axis of punch than the piercing edge, said broaching tooth being undercut to curl the chips of metal as they are cut from the walls of a hole of any cross sectional shape.

4. An apparatus for cold punching metal parts producing, in one operation, accurately sized highly finished holes with densified parallel sides: a punch of three component parts, having a piercing portion on its end followed by a coaxial planishing bead at a slightly greater distance from the axis of punch than the piercing edge, said planishing bead having a convex working surface and functioning in conjunction with any standard female die; and with the body of such punch being of two separate parts, to allow the mounting of a separate and removable planishing bead at the junction of the two punch body parts.

ROY J. FRETER.

REFERENCES CITED

The following references are of record in the file of this patent:

UNITED STATES PATENTS

| Number | Name | Date |
|---|---|---|
| 120,162 | Mullen | Oct. 24, 1871 |
| 199,715 | Jenkins | Jan. 29, 1878 |
| 237,439 | Jenkins | Feb. 8, 1881 |
| 2,369,896 | Harris et al. | Feb. 20, 1945 |

FOREIGN PATENTS

| Number | Country | Date |
|---|---|---|
| 19,994 | Great Britain | Oct. 19, 1894 |